United States Patent
Cho et al.

(10) Patent No.: US 7,602,133 B2
(45) Date of Patent: Oct. 13, 2009

(54) ROBOT HAVING AN OBSTACLE DETECTION UNIT AND METHOD OF CONTROLLING THE SAME

(75) Inventors: Joon-kee Cho, Yongin-si (KR); Seok-won Bang, Yongin-si (KR); Yeon-ho Kim, Yongin-si (KR); Ki-wan Choi, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 119 days.

(21) Appl. No.: 11/606,344

(22) Filed: Nov. 30, 2006

(65) Prior Publication Data

US 2007/0252549 A1   Nov. 1, 2007

(30) Foreign Application Priority Data

May 1, 2006   (KR) .................... 10-2006-0039297

(51) Int. Cl.
*B25J 5/00* (2006.01)
(52) U.S. Cl. .................... 318/568.12; 901/1
(58) Field of Classification Search ............ 318/568.12; 700/245–247; 901/1, 46, 47, 49
See application file for complete search history.

(56) References Cited

U.S. PATENT DOCUMENTS

| | | | | |
|---|---|---|---|---|
| 4,638,445 A | * | 1/1987 | Mattaboni ..................... 701/23 |
| 4,920,520 A | * | 4/1990 | Gobel et al. ................... 367/99 |
| 5,402,051 A | * | 3/1995 | Fujiwara et al. ............. 318/587 |
| 5,548,511 A | * | 8/1996 | Bancroft ....................... 701/23 |
| 5,815,880 A | * | 10/1998 | Nakanishi ..................... 15/319 |
| 5,942,869 A | * | 8/1999 | Katou et al. ............. 318/568.12 |
| 6,142,252 A | | 11/2000 | Kinto et al. |
| 6,370,453 B2 | * | 4/2002 | Sommer ....................... 701/23 |
| 6,809,490 B2 | * | 10/2004 | Jones et al. ............. 318/568.12 |
| 2006/0184274 A1 | * | 8/2006 | Sakai et al. .................. 700/245 |

FOREIGN PATENT DOCUMENTS

| | | |
|---|---|---|
| DE | 19916427 A1 | 3/2000 |
| EP | 1672455 A1 | 6/2006 |
| JP | 62-047714 | 3/1987 |
| JP | 09-204224 | 8/1997 |
| JP | 2004-337301 | 12/2004 |
| JP | 2005-334149 | 12/2005 |

(Continued)

OTHER PUBLICATIONS

Chinese Office Action for corresponding Chinese Patent Application No. 200710078896.5 dated Dec. 26, 2008 (7 pgs).

(Continued)

*Primary Examiner*—Bentsu Ro
(74) *Attorney, Agent, or Firm*—Staas & Halsey LLP

(57) ABSTRACT

A robot having an obstacle detection unit and a method of controlling the robot. The robot includes a main body, a driving unit, an auxiliary body, and a control unit. The driving unit drives the main body along a given surface. The auxiliary body projects from the main body and detecting an obstacle around the main body. The control unit controls the driving unit according to results of the detection so that the main body and the obstacle are maintained at a predetermined distance from each other.

37 Claims, 12 Drawing Sheets

FOREIGN PATENT DOCUMENTS

| | | |
|---|---|---|
| KR | 10-2002-0049784 | 6/2002 |
| KR | 2003-0090628 | 1/2003 |
| KR | 1020030066992 | 8/2003 |
| KR | 2003-0083524 | 10/2003 |
| KR | 2003-0083525 | 10/2003 |
| KR | 10-2003-0090628 | 11/2003 |
| KR | 2006-0003188 | 1/2006 |
| WO | WO 02/059646 A1 | 8/2002 |
| WO | WO02/059646 A1 | 8/2002 |
| WO | WO 2004/081683 A1 | 9/2004 |
| WO | WO2005/036292 A1 | 4/2005 |

OTHER PUBLICATIONS

Notice of Examination Report dated Apr. 23, 2007.
Korea Office Action for corresponding Korea Patent Application No. 10-2006-0039297 dated Sep. 5, 2007.
Jung et al., "Whisker Based Mobile Robot Navigation", Computer Science Department, Australia, 1996 British Crown Copyright, pp. 497-504 (in English).
Japanese Office Action for corresponding Japanese Patent Application No.:2007-008167 dated Apr. 14, 2009 (3 pgs).
European Search Report for corresponding European Patent Application No. :060772258 dated Apr. 27, 2009 (6 pgs) (in English).

* cited by examiner

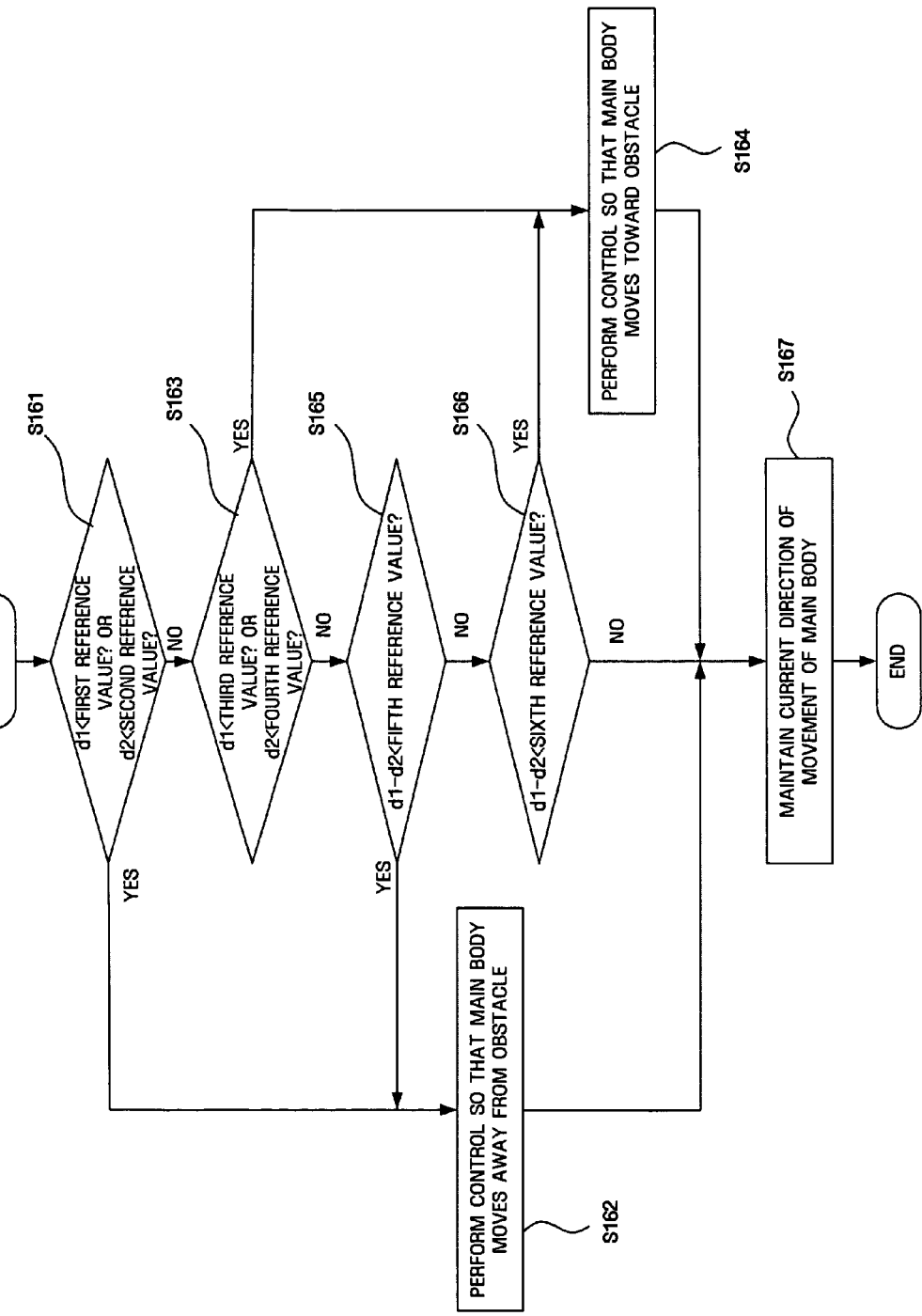

ROBOT HAVING AN OBSTACLE DETECTION UNIT AND METHOD OF CONTROLLING THE SAME

CROSS-REFERENCE TO RELATED APPLICATIONS

This application claims priority from Korean Patent Application No. 10-2006-0039297 filed on May 1, 2006 in the Korean Intellectual Property Office, the disclosure of which is incorporated herein by reference in its entirety.

BACKGROUND OF THE INVENTION

1. Field of the Invention

The present invention relates to a robot having an obstacle detection unit and a method of controlling the robot. More particularly, to a robot having an obstacle detection unit and a method of controlling the robot capable of maintaining the robot at a constant distance from obstacles.

2. Description of the Related Art

A conventional cleaning robot is an automatic cleaning machine that cleans an area while moving across the area by itself without a user's intervention.

In the conventional cleaning robot, an intake port is integrated with a main body, or is fabricated as a separate part and mounted on the main body. In the case where the intake port is integrated with the main body, the intake port is defined in the lower portion of the main body and is located inside of the outer edge of the main body. Therefore, the location and direction of suction are determined only by the movement of the main body. As a result, it is difficult to realize sufficient cleaning along walls, in areas adjacent to obstacles and in corners.

When the intake port is manufactured as a separate part and is mounted on the main body, an intake tube and an intake nozzle project from the main body, as in a typical canister-type vacuum cleaner. Accordingly, when using the canister-type vacuum cleaner, a user must control the canister-type vacuum cleaner in such a way that the user holds a suction head using his or her hand and sweeps the suction head over an area to be cleaned, so the location and direction of the intake port can be controlled separately from those of the main body, the control algorithm and joint structure thereof are very complicated, and manufacturing cost is high.

Recently, a scheme of manufacturing the intake port separately and mounting the intake port on the main body so that it can freely rotate has been developed. In this case, the free rotation of the intake port is performed such that the intake port is always located perpendicular to the direction of movement or rotation of the main body by frictional force acting on wheels mounted on the intake port and inertia based on the center of gravity, which is located behind the center of rotation of the intake port.

However, when the intake port is configured to freely rotate, the rotational response of the intake port may lag behind the movement or rotation of the main body. Accordingly, a problem occurs in that the cleaning performance thereof is degraded when the direction frequently changes.

Furthermore, since the intake port has a freely rotated structure, it is difficult to clean an uneven area or a carpet. Additionally, it is even more difficult to precisely control the intake port. Thus, there is a problem in that it is difficult to move the intake port close to a wall when cleaning a corner.

Korean Unexamined Patent Publication No. 2006-0003188 discloses a cleaning robot having an intake port mounted to project outside the main body thereof and to be rotatable with respect to the main body. Therefore, the cleaning robot can clean a wide area and can clean near a corner. This above-mentioned disclosure relates to a technology through which the intake port approaches an obstacle, a wall or a corner and performs cleaning. Accordingly, this disclosure does not propose a scheme for controlling the direction of movement of a robot in consideration of the surface state of an obstacle and maintaining a constant distance from the obstacle, even in the case where the surface of the obstacle is uneven.

SUMMARY OF THE INVENTION

Accordingly, an aspect of the present invention is to provide a robot having an obstacle detection unit and a method of controlling the same, which detects a state of the surface of an obstacle via contact with the obstacle, and control a direction of movement of the robot such that the robot moves while maintaining a predetermined distance from the obstacle.

Additional aspects and/or advantages of the invention will be set forth in part in the description which follows and, in part, will be apparent from the description, or may be learned by practice of the invention.

The foregoing and/or other aspects of the present invention are achieved by providing a robot having an obstacle detection unit, the robot including a main body,; a driving unit driving the main body along a given surface, an auxiliary body projecting from the main body and detecting an obstacle around the main body, and a control unit controlling the driving unit according results of the detection so that the main body and the obstacle are maintained at a predetermined distance from each other.

It is another aspect of the present invention to provide a method of controlling a robot having an obstacle detection unit, the method including driving a main body along a given surface, projecting an auxiliary body from the main body and detecting an obstacle around the main body, and controlling the robot such that the main body and the obstacle are maintained at a predetermined distance according to results of the determination.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 12 is a flowchart illustrating a method of controlling the direction of movement of a main body according to an embodiment of the present invention.

DETAILED DESCRIPTION OF THE PREFERRED EMBODIMENTS

Figure 1:
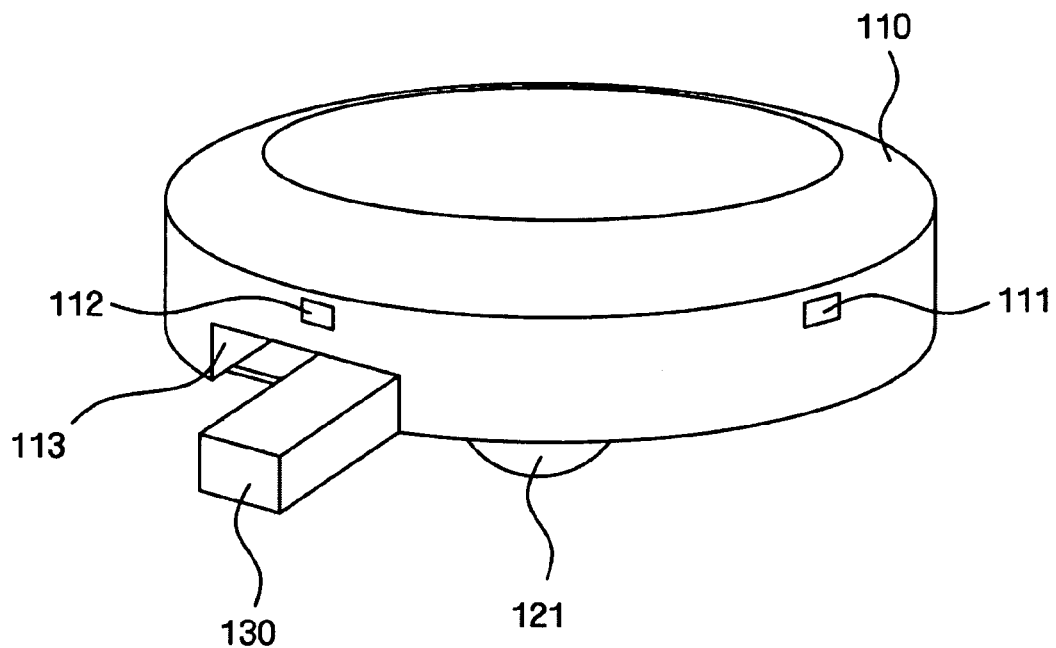
FIG. 1 is a perspective view illustrating a robot having an obstacle detection unit according to an embodiment of the present invention.

Reference will now be made in detail to the embodiments of the present invention, examples of which are illustrated in the accompanying drawings, wherein like reference numerals refer to like elements throughout. The embodiments are described to explain the present invention by referring to the figures.

Figure 2:
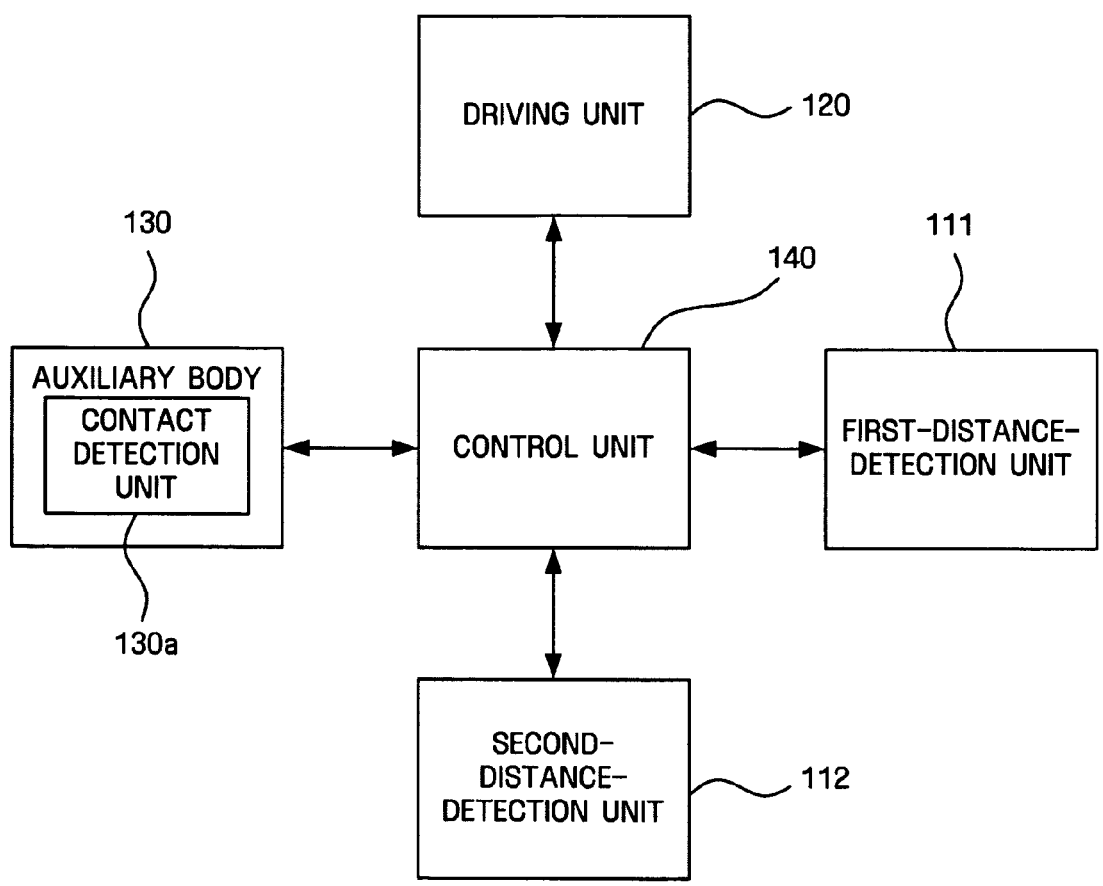
FIG. 2 is a block diagram illustrating the construction of the robot having an obstacle detection unit according to the embodiment of the present invention.

FIG. 1 is a perspective view illustrating a robot 100 having an obstacle detection unit according to an embodiment of the present invention. FIG. 2 is a block diagram illustrating the construction of the robot 100 having an obstacle detection unit according to the embodiment of the present invention.

As shown in FIGS. 1 and 2, the robot 100 comprising an obstacle detection unit according to an embodiment of the present invention, the robot 100comprises a driving unit 120 driving a main body 110 so that the main body 110 can move along a surface, an auxiliary body 130 (i.e., an obstacle detection unit) projecting outside the main body 110 and detecting obstacles around the main body 110, and a control unit 140 controlling the driving unit 120 according to results of the detection by the auxiliary body 130, thereby controlling the direction of movement of the main body 110.

The main body 110 comprises a first distance detection unit 111 detecting a distance from a front obstacle based on a direction of movement of the main body 110, and a second distance detection unit 112 detecting a distance from a lateral obstacle based on the direction of movement of the main body 110. The first and second distance detection units 111 and 112 may be infrared sensors, ultrasonic sensors, or the like. However, the present invention is not limited hereto, and may vary, as necessary.

In this embodiment of the present invention, the control unit 140 changes the direction of movement of the main body 110 by controlling the driving unit 120 when the first distance detection unit 111 detects an obstacle located in front of the main body 110, and changes the direction of movement of the main body 110 by controlling the driving unit 120 according to the distance to an obstacle, which is detected by the second distance detection unit 112, when the direction of movement of the main body 110 is changed and, consequently, the obstacle comes to be located beside the main body 110. According to an embodiment of the present invention, the driving unit 120 changes the direction of movement of the main body 110 by driving a driving wheel 121 located on a surface of the main body 110 adjacent to the surface. Furthermore, in this embodiment of the present invention, when the auxiliary body 130 projects through the side of the main body 110 on which the second distance detection unit 112 is placed, is taken and described as an example.

According to this embodiment of the present invention, the first distance detection unit 111 and the second distance detection unit 112 detect distances from obstacles located in front of and beside the main body 110 so as to detect the distances between the main body 130 and obstacles, for example. However, the present invention is not limited hereto, and a plurality of distance detection units may be used depending on the direction for detection of the distance from the main body 110 to an obstacle.

When the direction of movement of the main body 110 has changed according to the results of detection of the first distance detection unit 111, the control unit 140 allows the auxiliary body 130 to project to an outside through an opening 113 formed in the main body 110. A contact detection unit 130a detecting contact with an obstacle and generating a corresponding signal is formed in an outer end of the auxiliary body 130 that projects from the main body 110. Accordingly, the control unit 140 determines whether the auxiliary body 130 projecting from the main body 110 comes into contact with an obstacle using a signal generated by the contact detection unit 130a.

The contact detection unit 130a is a switch or roller, for example. However, the contact detection unit 130a is not limited hereto and may vary, accordingly. The control unit 140 determines that the auxiliary body 130 has come into contact with an obstacle using a signal that is generated when an outer end of the auxiliary body 130 comes into contact with the obstacle and, thereby, the switch is pressed or the roller is rotated, for example. Thereafter, the control unit 140 controls the direction of movement of the main body 110 by controlling the driving unit 120 so that contact between the auxiliary body 130 and the obstacle can be maintained, therefore accurate control of the direction of movement can be achieved compared to control based on the distance detected by the second distance detection unit 112.

Figure 3:
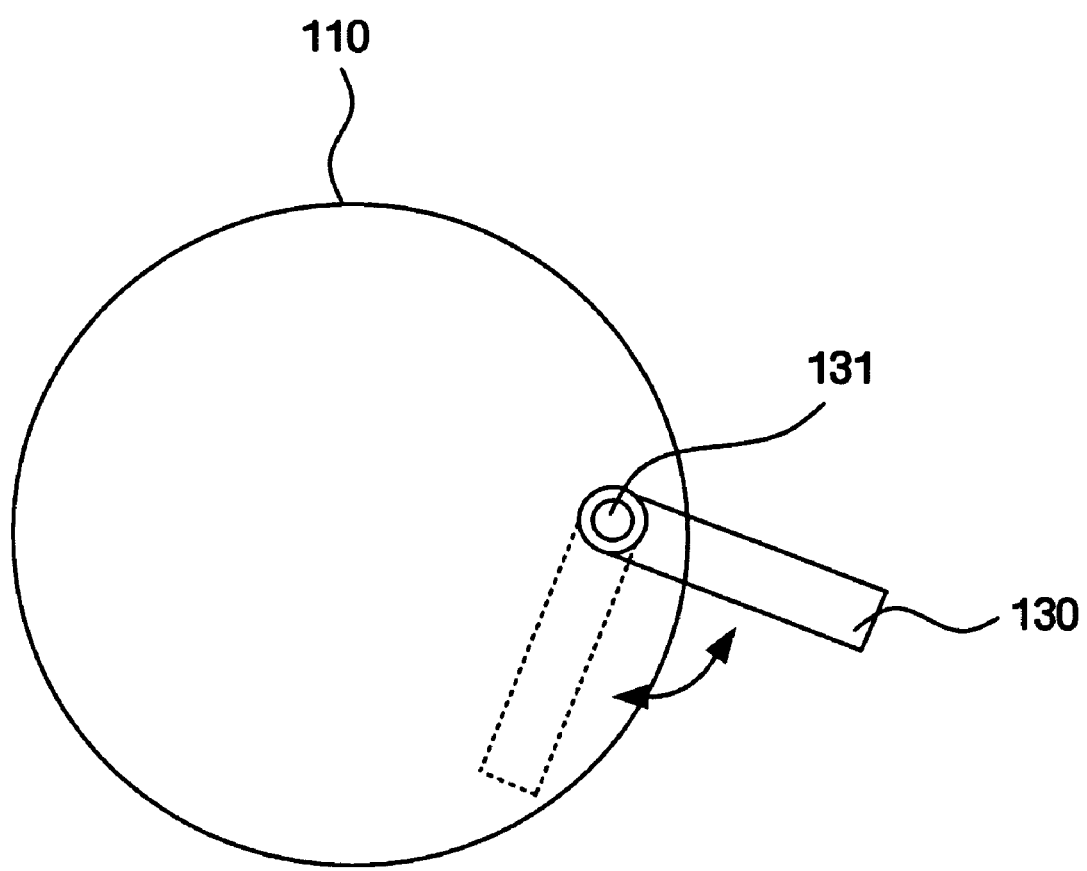
FIG. 3 is a schematic diagram illustrating the structure of the connection between a main body and an auxiliary body according to a first embodiment of the present invention.

FIG. 3 is a schematic diagram illustrating the structure of the connection between the main body 110 and the auxiliary body 130 according to a first embodiment of the present invention.

As shown in FIG. 3, in the structure of the connection between the main body 110 and the auxiliary body 130 according to the first embodiment of the present invention, the auxiliary body 130 is connected with a motor 131 mounted in the main body 110, and the auxiliary body 130 projects from the opening 113 of the main body 110 as the motor 131 is rotated. Furthermore, the motor 131 and the auxiliary body 130 are connected via a tension spring. Therefore, the auxiliary body 130 can be rotated through a predetermined angle with respect to the point of connection with the motor 131 when external force is applied to the auxiliary body 130.

Figure 4:
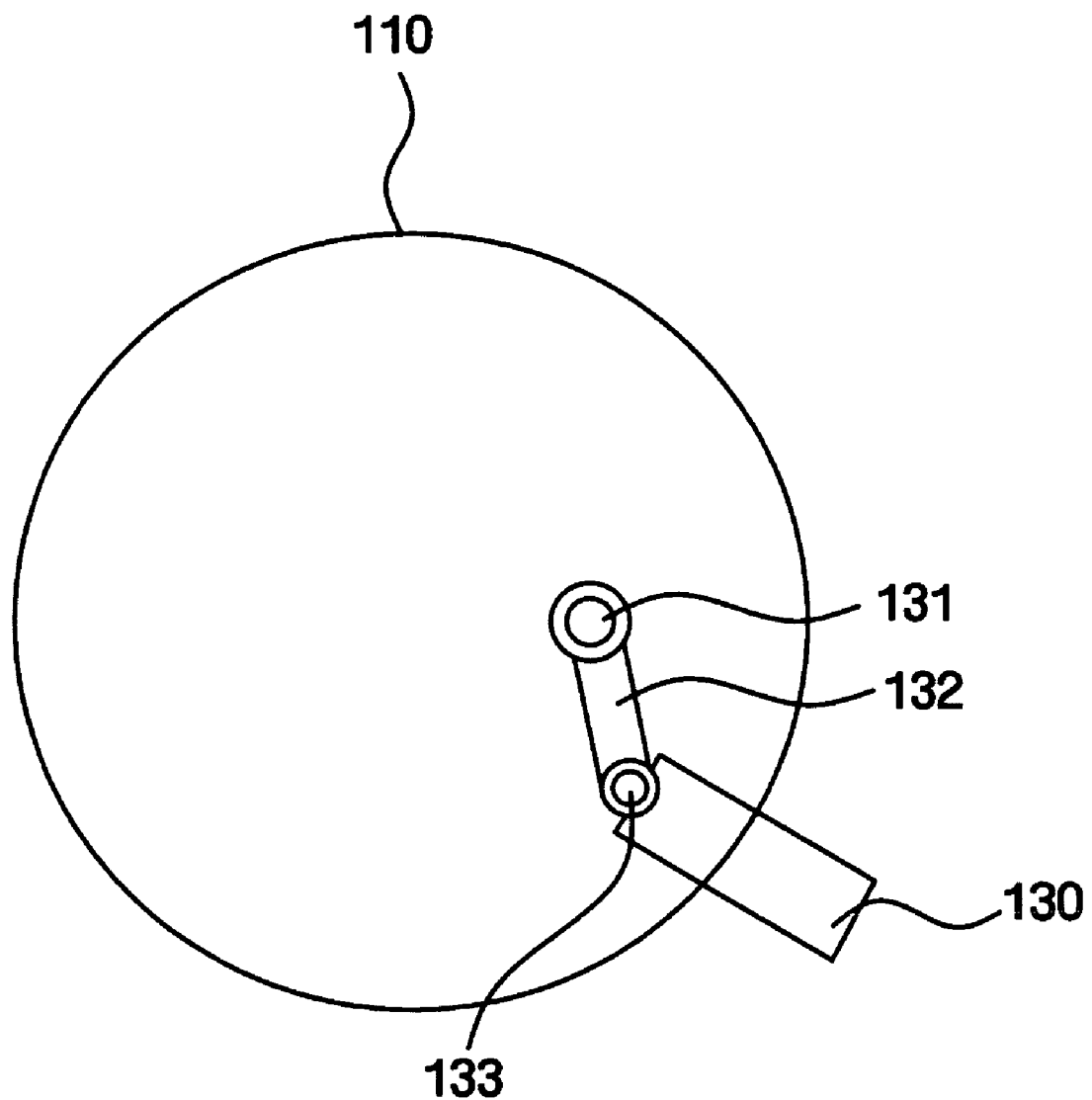
FIG. 4 is a schematic diagram illustrating the structure of the connection between a main body and an auxiliary body according to a second embodiment of the present invention.

FIG. 4 is a schematic diagram illustrating the structure of the connection between the main body 110 and the auxiliary body 130 according to a second embodiment of the present invention.

Figure 5:
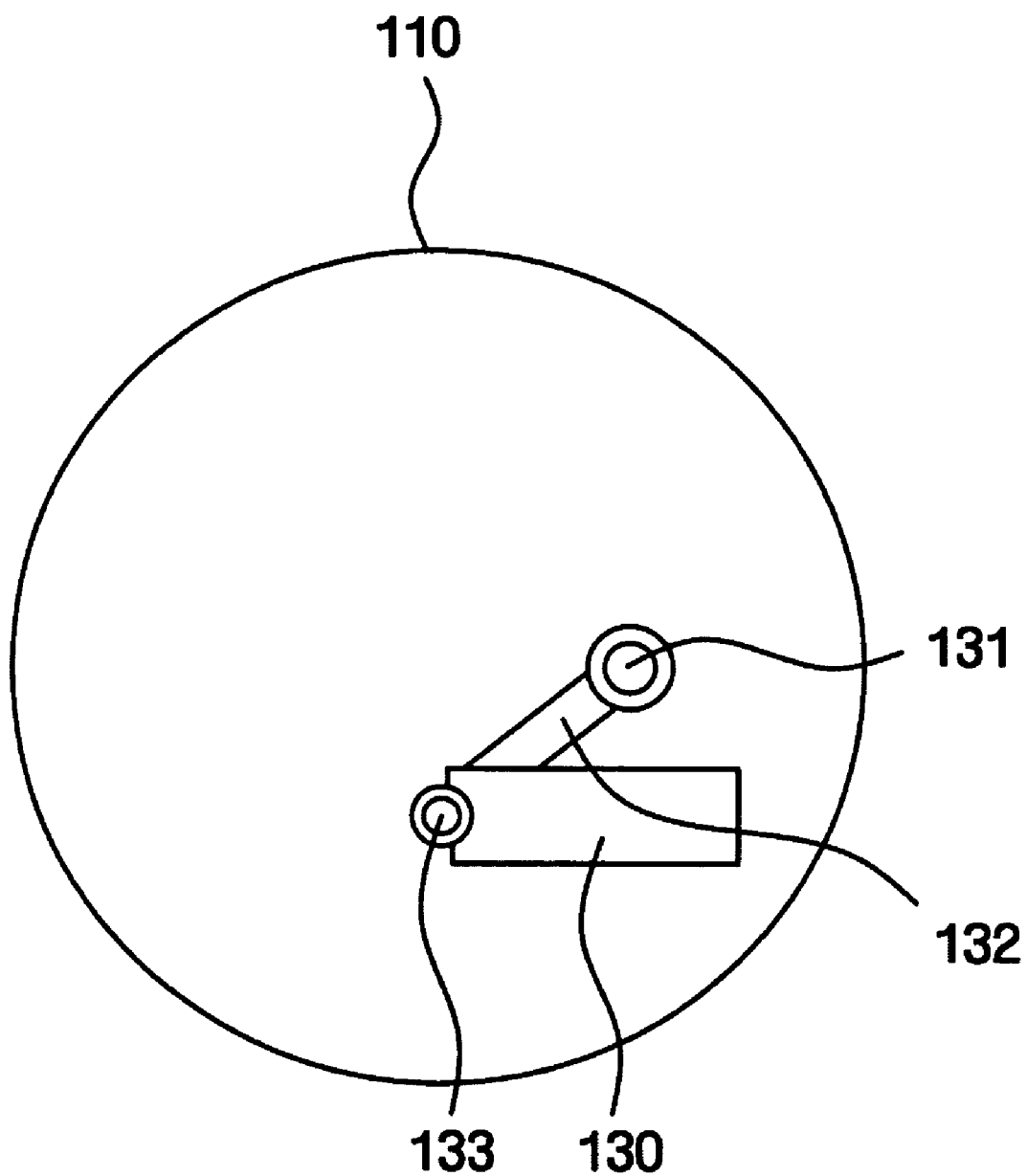
FIG. 5 is a schematic diagram illustrating the auxiliary body of FIG. 4 located in the main body.

As shown in FIG. 4, in the structure of the connection between the main body 110 and the auxiliary body 130 according to the second embodiment of the present invention, the auxiliary body 130 is connected with a connection rod 132, one end of which is connected to the motor 131 via a connection 133. A tension spring or the like is formed in the connection 133, therefore, the auxiliary body 130 is rotated through a predetermined angle with respect to the connection 133 when an external force is applied to the auxiliary body 130. When the auxiliary body 130 does not project from the main body 110, the connection structure of FIG. 4 is as shown in FIG. 5, in which the connection rod 132 is rotated into the main body 110 through the rotation of the motor 131. In contrast, when the auxiliary body 130 projects from the main body 110, the connection structure assumes the structure of FIG. 4, in which the motor 131 is rotated, the connection rod 132 is rotated outside the main body 110, and the auxiliary body 130 projects from the main body 110 through the opening 113 of the main body 110.

The control unit 140 controls the driving unit 120 based on the distance ("d1") detected by the second distance detection unit 112 and the distance ("d2") from the outside surface of the main body 110 to the outer end of the auxiliary body 130 projecting from the main body 110, so the main body 110 can maintain a predetermined distance from an obstacle.

Figure 6:
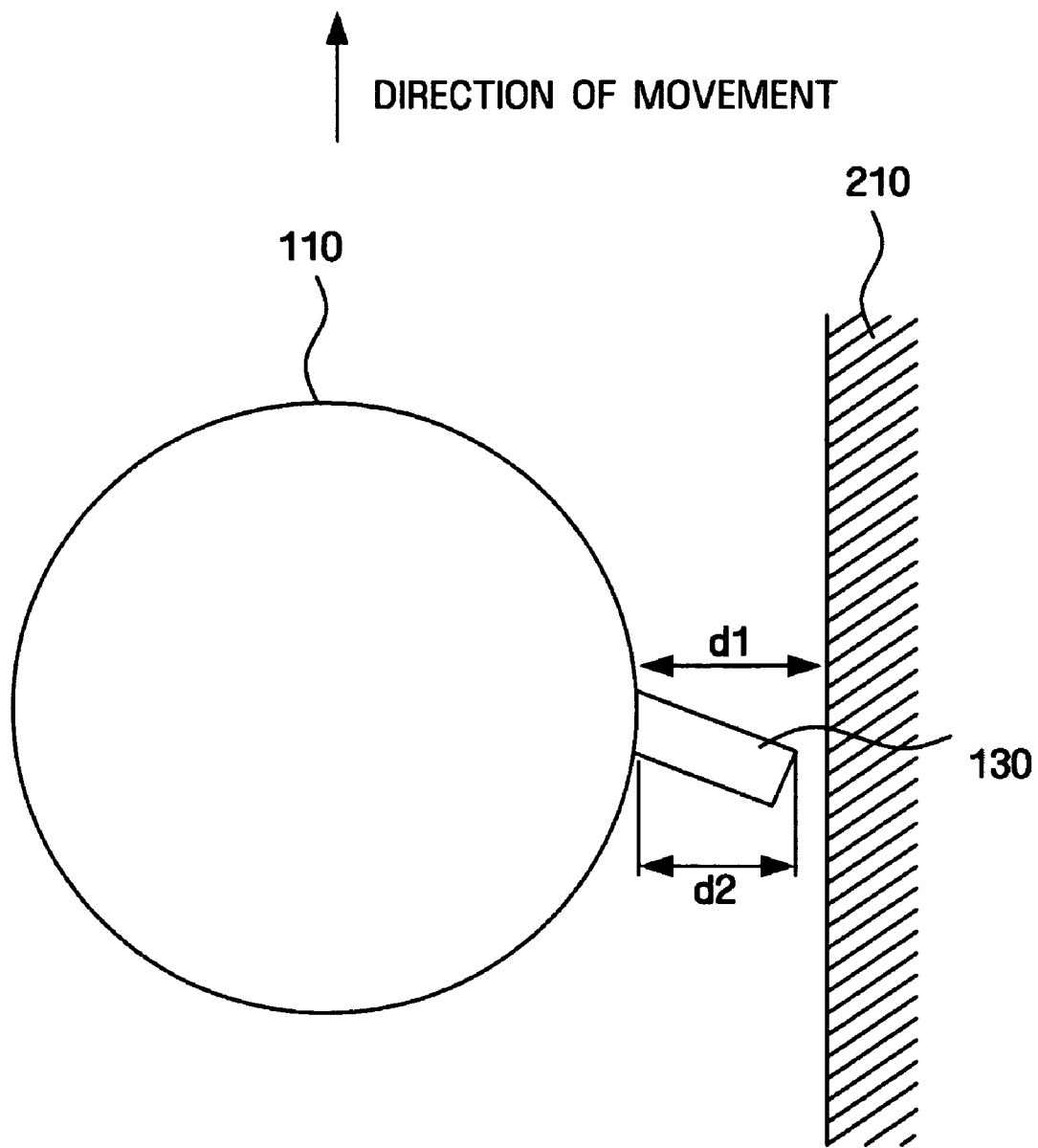
FIG. 6 is a schematic diagram illustrating d1 and d2 according to an embodiment of the present invention.

FIG. 6 is a diagram illustrating distances d1 and d2 according to an embodiment of the present invention. Although FIG. 6 illustrates the above-described connection structure of FIG. 3 as an example, d1 and d2 can be detected in the connection structure of FIG. 4 in a similar manner.

As illustrated in FIG. 6, the control unit 140 controls the driving unit 120 based on the difference between d1, that is, the distance detected by the second distance detection unit 112, and d2, that is, the distance from the main body 110 and an end of the auxiliary body 130 projecting from the main body 110, thereby controlling the direction of movement of the main body 110.

When the second distance detection unit 112 is an ultrasonic sensor, for example, d1 is detected using the time that is required for an ultrasonic wave generated by the ultrasonic sensor to be reflected by an obstacle 210 and return. The control unit 140 detects d2 using an angle formed by the auxiliary body 130.

Furthermore, the control unit 140 detects d2 using an angle formed by the auxiliary body 130 with respect to the motor 131 in FIG. 3. In FIG. 4, d2 is detected using an angle formed by the auxiliary body 130 with respect to the connection 133 between the connection rod 132 and the auxiliary body 130.

Figure 7:
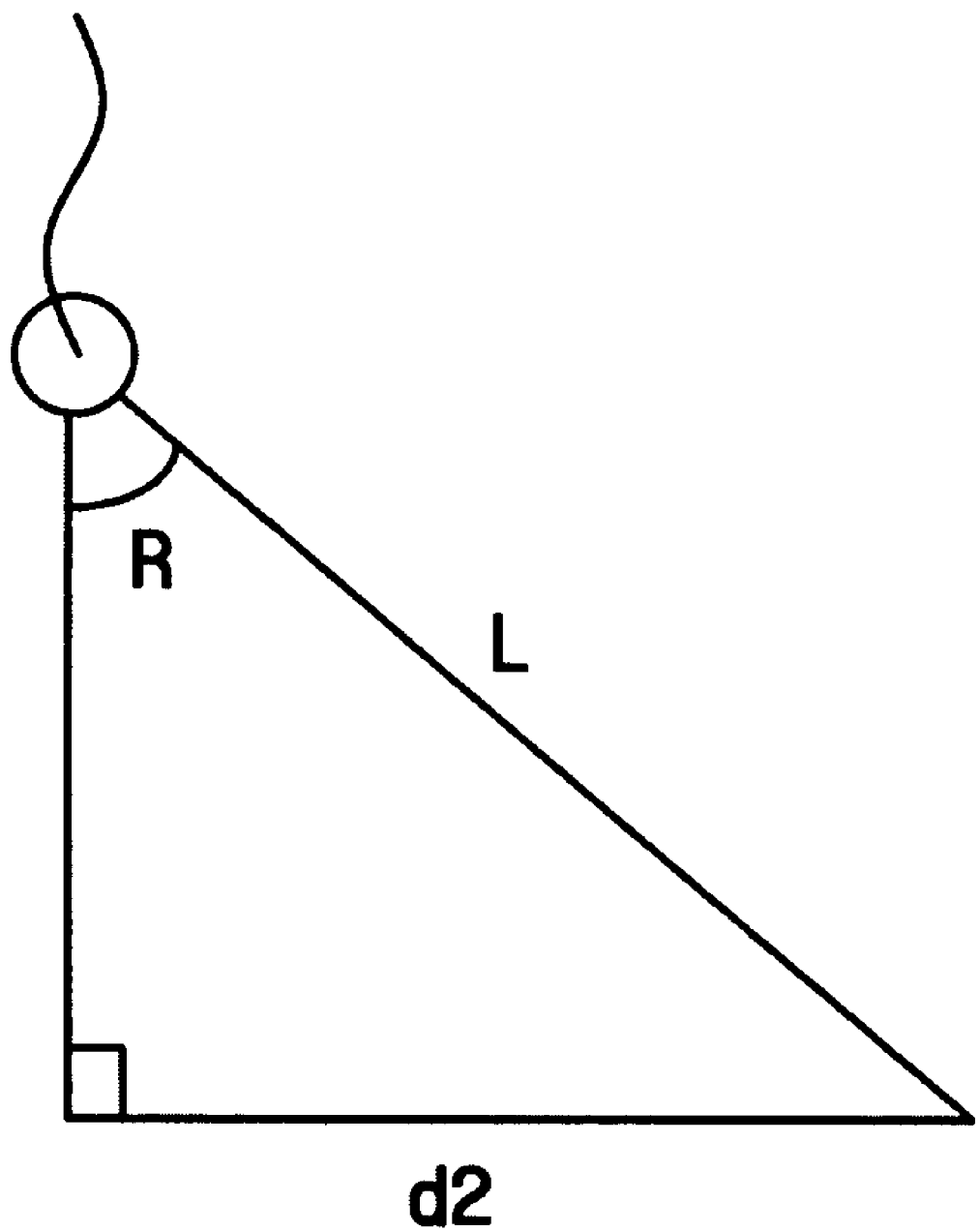
FIG. 7 is a schematic diagram illustrating d2 that is obtained using the length of the auxiliary body and an angle formed by the auxiliary body according to an embodiment of the present invention.

For example, as shown in FIG. 3, the control unit 140 detects an angle R formed by the auxiliary body 130 and the direction of movement of the main body 110 based upon the motor 131, and the length L of the auxiliary body 130, as shown in FIG. 7. As a result, the control unit 140 can obtain d2 using the above-described angle R and length L and Equation 1. When the motor 131 is located inside the main body 110, net d2 can be obtained by subtracting the distance from the motor 131 to the outside surface of the main body 110 from d2 obtained using the above-described Equation 1.

$$d2 = L * \sin R \quad (1)$$

When the surface of the obstacle 210 is uniform, the difference between d1 and d2 can be kept constant. In contrast, when the surface of the obstacle 210 is not uniform, the difference between d1 and d2 may vary. When the difference between d1 and d2 is not uniform it can be interpreted to mean that the depth of the surface of the obstacle 210 is not uniform. When the depth of the surface of the obstacle 210 is not uniform, the control unit 140 according to an embodiment of the present invention, controls the direction of movement of the main body 110 using the difference between d1 and d2, so that the main body 110 can maintain a predetermined distance from the surface of the obstacle 210.

Figure 8:
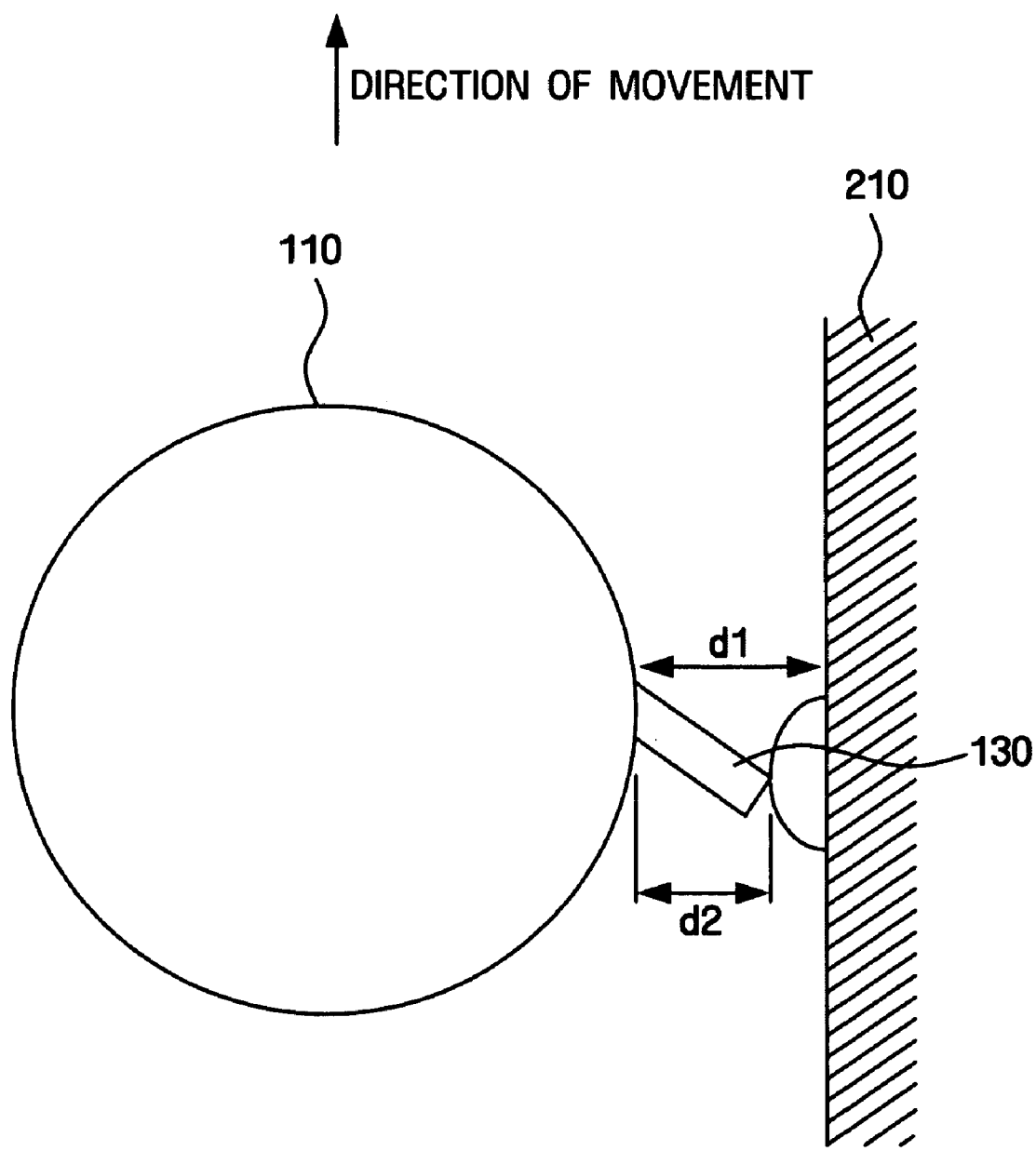
FIG. 8 is a schematic diagram illustrating the position of the auxiliary body when the surface of an obstacle is convex according to an embodiment of the present invention.

In particular, when the difference between d1 and d2 is larger than a first reference value, the control unit 140 determines that the surface of the obstacle 210 is convex. That is, when the surface of the obstacle 210 is convex, as shown in FIG. 8, the auxiliary body 130 is rotated in a direction opposite the direction toward the obstacle 210 by the action of the tension spring, with the result that d2 i.e., the distance between the outside surface of the main body 110 to the outer end of the auxiliary body 130, becomes shorter. Accordingly, the control unit 140 controls the driving unit 120 so that the main body 110 can move away from the obstacle 210.

Figure 9:
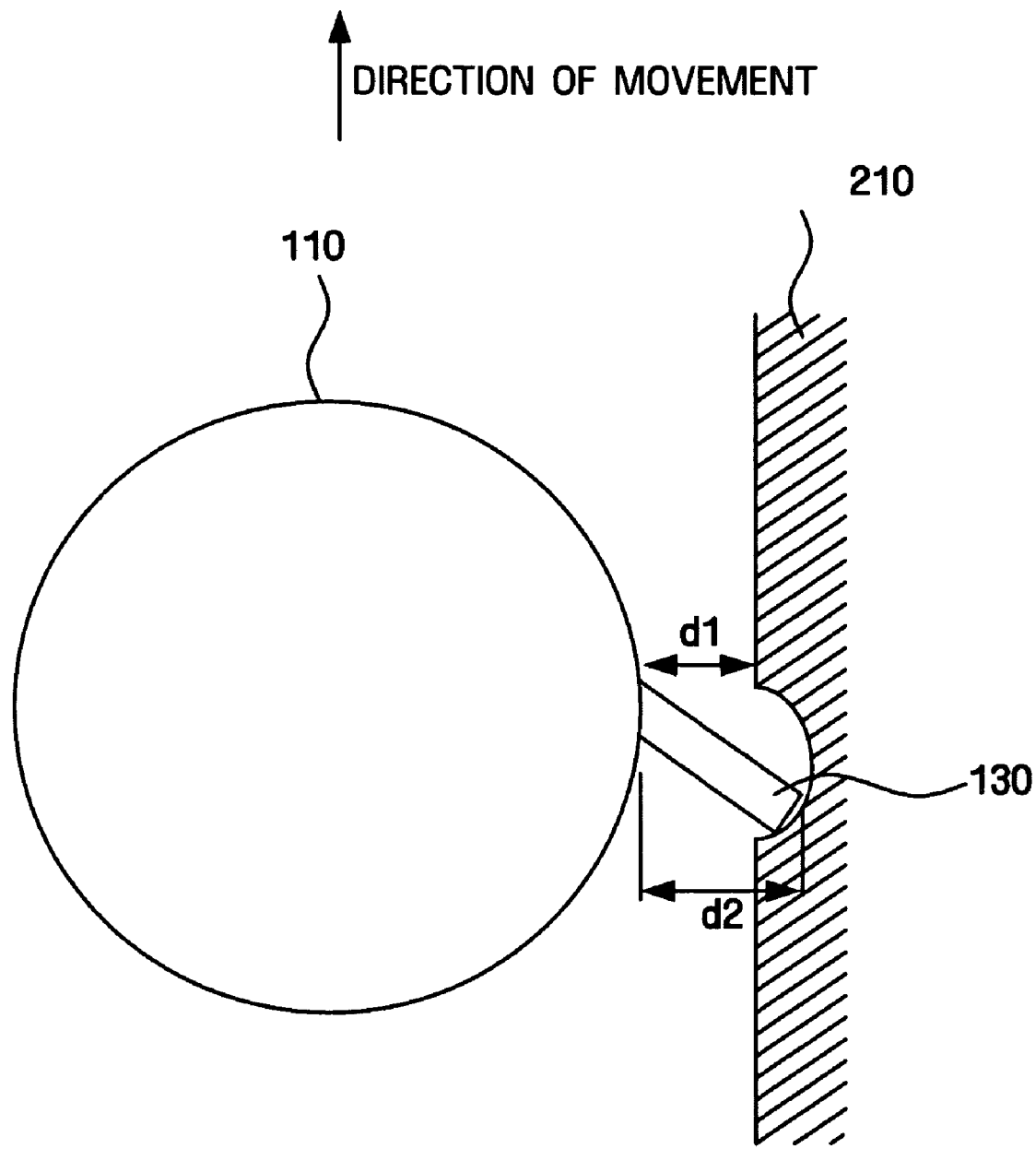
FIG. 9 is a schematic diagram illustrating the position of the auxiliary body when the surface of an obstacle is concave according to an embodiment of the present invention.

Meanwhile, when d2 is larger than a second reference value, the control unit 140 determines that the surface of the obstacle 210 is concave. That is, when the surface of the obstacle 210 is concave, as shown in FIG. 9, the auxiliary body 130 is rotated in the direction toward the obstacle 210 due to the action of the above-described tension spring, with the result that d2, that is, the distance from the main body 110 to the outer end of the auxiliary body 130, becomes longer. Accordingly, the control unit 140 controls the driving unit 120 so that the main body 110 approaches the obstacle 210.

Figure 10:
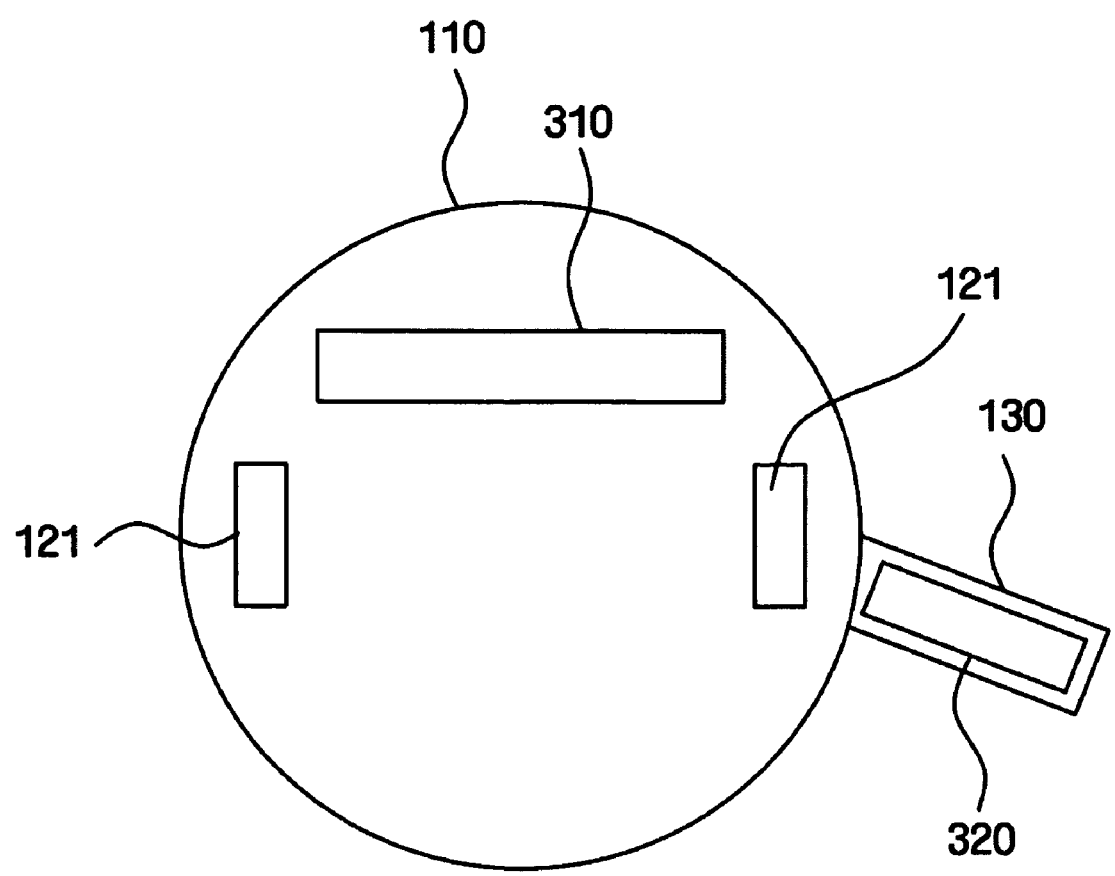
FIG. 10 is a schematic diagram illustrating a first intake port and a second intake port according to an embodiment of the present invention.

Meanwhile, when first and second intake ports 310 and 320 sucking dust and dirt, or alternatively, brushes, are formed respectively in the main body 110 and the auxiliary body 130 in portions thereof adjacent to the moving surface of the main body 110, as shown in FIG. 10, a robot 100 having an obstacle detection unit according to an embodiment of the present invention can be used as a cleaning robot capable of performing cleaning.

Since the robot 100 having an obstacle detection unit according to the embodiment of the present invention can move while maintaining a predetermined distance from an obstacle located beside the main body 110 using the auxiliary body 130, the robot 100 can move while maintaining an accurate distance, compared to the above-described case where the robot moves while detecting the distance from an obstacle using the second distance detection unit 112. Thus, the auxiliary body 130 can be rotated in specific directions depending on the depth of the surface of the obstacle and the direction of movement of the main body 110 is changed based on an angle formed by the rotation of the auxiliary body 130, thereby allowing the main body 110 to maintain a predetermined distance from an obstacle.

As a result, when the robot 100 having an obstacle detection unit according to the embodiment of the present invention is used indoors, and the main body 110 moving along a floor detects a wall, the auxiliary body 130 projects from the main body 110 so as to clean a corner where the floor and the wall meet each other, thereby maintaining a predetermined distance from the wall regardless of protrusions and depressions using the difference between distances d1 and d2 while maintaining contact with the wall, therefore cleaning efficiency can be improved.

Figure 11:
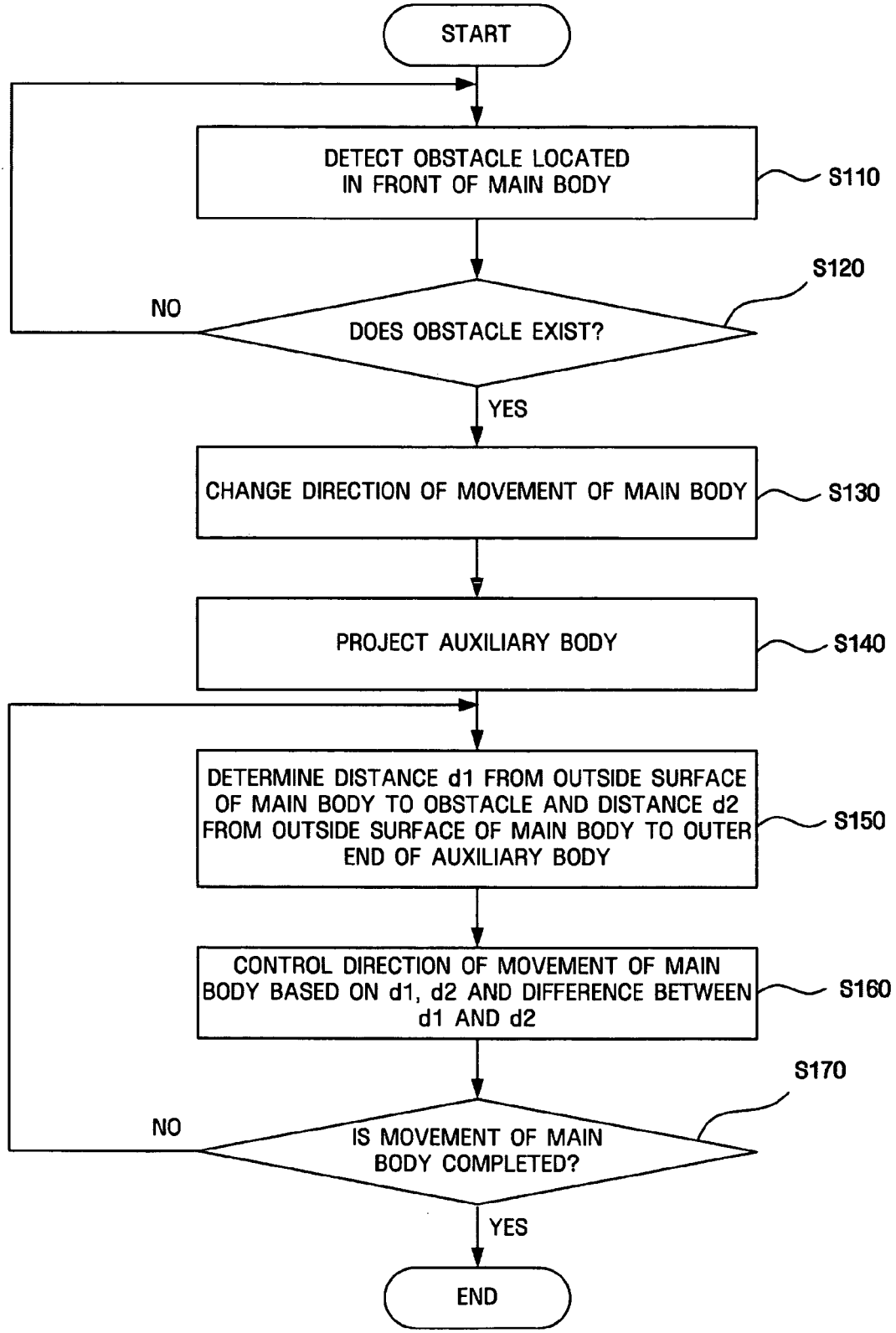
FIG. 11 is a flowchart illustrating a method of controlling a robot having an obstacle detection unit according to an embodiment of the present invention.

FIG. 11 is a flowchart illustrating a method of controlling a robot having an obstacle detection unit according to an embodiment of the present invention.

As shown in FIG. 11, in the method of controlling a robot having an obstacle detection unit according to the embodiment of the present invention, in operation 110, while the main body 110 moves along a given surface, the first distance detection unit 111 detects whether an obstacle is located in front of the main body 110. In this embodiment, an infrared sensor or an ultrasonic sensor may be used, for example, as the first distance detection unit 111.

If, as a result of the detection of the first distance detection unit 111, an obstacle is determined to be located in front of the main body 110 at operation 120, the process moves to operation 130, where the control unit 140 controls the driving unit 120 to change the direction of movement of the main body 110.

After the direction of movement of the main body 110 has been changed, the control unit 140 controls the auxiliary body 130 so that the auxiliary body 130 projects from the opening 113 of the main body 110 at operation 140. In this case, the control unit 140 can control the direction of movement of the main body 110 until contact with an obstacle is detected by the contact detection unit 130a placed at the end of the auxiliary body 130.

When the outer end of the auxiliary body 130 and an obstacle come into contact, the control unit 140 determines d1, that is, the distance to the obstacle detected by the second distance detection unit 112, and d2, that is, the distance from the outside surface of the main body 110 to the outer end of the auxiliary body 130, at operation 150.

Thereafter, the control unit 140 controls the direction of movement of the main body 110 using d1, d2, and the difference between d1 and d2 so that the main body 110 can maintain a predetermined distance from the obstacle at operation 160.

The control unit 140 repeats the above-described operations 150 and 160 until the movement of the main body 110 is completed at operation 170.

FIG. 12 is a flowchart illustrating a method of controlling the direction of movement of a main body according to an embodiment of the present invention. FIG. 12 illustrates a method of controlling the direction of movement of the main body 110 using d1, d2, and the difference between d1 and d2, as set forth at operation 160 of FIG. 11.

As shown in FIG. 12, in the method of controlling the direction of movement of the main body according to the embodiment of the present invention, if the previously determined d1 is smaller than the first reference value, or the previously determined d2 is smaller than the second reference value at operation 161, the control unit 140 determines that the surface of the obstacle is convex and controls the driving unit 120, and thus the direction of the main body 110, so that the main body 110 moves away from the obstacle at operation 162. In this case, when the auxiliary body 130 projects from the main body 110, it can maintain a predetermined distance from the outside surface of the main body 110. Furthermore, since the auxiliary body 110 can rotate within a predetermined angle, as shown in FIGS. 3 and 4, the auxiliary body 130 rotates toward the main body 110 when the surface of the obstacle is convex, therefore the distance from the outside surface of the main body 110 to the outer end of the auxiliary body 130 is decreased.

When the determined d1 is larger than a third reference value or the determined d2 is larger than a fourth reference value at operation 163, the process moves to operation 164, where the control unit 140 determines that the surface of the obstacle is concave, and controls the driving unit 120, and thus the direction of movement of the main body 110, so that the main body 110 approaches the obstacle.

Meanwhile, when d1 and d2 do not meet the conditions of the above-described operations 161 and 163, the control unit 140 can control the direction of movement of the main body 110 using the difference between d1 and d2.

In other words, the control unit 140 calculates the difference between d1 and d2, determines that the surface of the obstacle is concave if the result of the calculation is smaller than a fifth reference value at operation 165, as at operation 161, and controls the driving unit 120, and thus the direction of movement of the main body 110, so that the main body 110 moves away from the obstacle.

The control unit 140 determines that the surface of the obstacle is convex if the result of the calculation is larger than a sixth reference value at operation 166, as at operation 163, and controls the driving unit 120, and thus the direction of movement of the main body 110, so that the main body 110 approaches the obstacle.

Meanwhile, when the above-described operations 161, 163, 165 and 166 are not satisfied, the control unit 140 maintains the current direction of movement of the main body 110 at operation 167.

The above-described method of controlling the robot 100 having an obstacle detection unit may be applied to the above-described cleaning robot in a similar manner.

In particular, when the robot 100 having an obstacle detection unit according to an embodiment of the present invention is used as a cleaning robot, the first intake port 310 and the second intake port 320 are respectively formed in the main body 110 and the auxiliary body 130, and a predetermined distance from an obstacle can be maintained using the auxiliary body 130, as described above. As a result, the predetermined distance from an obstacle can be maintained, and the distance can also be maintained at the time of cleaning along a wall, thereby enabling accurate cleaning, and the direction of movement of the main body 110 can be controlled using the auxiliary body 130 even in the case where an unexpected situation, such as the presence of an uneven portion on a wall, arises.

The above-described robot having an obstacle detection unit and the method of controlling the robot according to an embodiment of the present invention, the robot can move while maintaining a predetermined distance from an obstacle using the auxiliary body, which is in contact with the obstacle, even in the case where the surface of the obstacle is not even.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A robot comprising:
a main body;
a driving unit to drive the main body along a given surface;
an auxiliary body to project from the main body and to detect an obstacle around the main body;
a distance detection unit which detects a distance between an outside surface of the main body and the obstacle; and
a control unit to control the driving unit based on a difference between the distance measured by the distance detection unit and a distance from the outside surface of the main body to a far end of the auxiliary body so that the main body and the obstacle are maintained at a predetermined distance from each other while the robot is moving.

2. The robot of claim 1, wherein the main body comprises:
a first distance detection unit to detect a distance from an obstacle located in front of the main body when the main body moves along the surface; and
a second distance detection unit to detect a distance from an obstacle located beside the main body.

3. The robot of claim 2, wherein the control unit controls the driving unit such that a direction of movement of the main body changes when the obstacle is detected in front of the main body by the first distance detection unit.

4. The robot of claim 3, wherein the auxiliary body projects from the main body when the direction of movement of the main body changes due to the obstacle located in front of the main body.

5. The robot of claim 4, wherein the auxiliary body can rotates through a predetermined angle depending on a depth of a surface of the obstacle when projecting from the main body.

6. The robot of claim 4, wherein the main body and the auxiliary body comprise a first intake port and a second intake port, respectively, the first and second intake ports sucking dust and dirt from the surface along which the robot is driven.

7. The robot of claim 2, wherein the control unit controls a direction of movement of the main body based on a distance detected by the second distance detection unit and the distance from the outside surface of the main body to the far end of the auxiliary body.

8. The robot of claim 7, wherein the control unit controls the main body to move away from the obstacle when the distance detected by the second distance detection unit is smaller than a first reference value or the distance from the outside surface of the main body to the outer end of the auxiliary body is smaller than a second reference value.

9. The robot of claim 7, wherein the control unit controls the main body to approach the obstacle when the distance detected by the second distance detection unit is larger than a third reference value or the distance from the outside surface of the main body to the outer end of the auxiliary body is larger than a fourth reference value.

10. The robot of claim 7, wherein the control unit controls the main body to move away from the obstacle when a difference between the distance detected by the second distance detection unit and the distance from the outside surface of the main body to the outer end of the auxiliary body is smaller than a fifth reference value.

11. The robot of claim 7, wherein the control unit controls the main body to approach the obstacle when a difference between the distance detected by the second distance detection unit and the distance from the outside surface of the main body to the outer end of the auxiliary body is larger than a sixth reference value.

12. The robot of claim 1, wherein the auxiliary body projects outside of the main body through an opening that is formed in one side of the main body.

13. The robot of claim 1, further comprising a motor mounted in the main body, wherein the auxiliary body is connected with the motor.

14. The robot of claim 1, further comprising a connection rod which is connected on one side with a motor mounted in the main body, wherein the auxiliary body is connected with the connection rod.

15. The robot of claim 1, wherein the auxiliary body comprises a contact detection unit on one side thereof, which detects contact with the obstacle.

16. The robot of claim 15, wherein:
the contact detection unit generates a predetermined signal when it comes into contact with the obstacle; and
the control unit controls the driving unit in response to the generated signal and controls the direction of movement of the main body.

17. A method of controlling a robot, the method comprising:
driving a main body of the robot along a given surface;
projecting an auxiliary body from the main body of the robot and detecting an obstacle around the main body;
detects a distance between an outside surface of the main body and the obstacle; and
performing control such that the main body and the obstacle are maintained at a predetermined distance from each other, the control being based on a difference between the detected distance and a distance from the outer surface of the main body to a far end of the auxiliary body.

18. The method of claim 17, wherein the driving the main body comprises:
detecting a distance from an obstacle located in front of the main body when the main body moves along the surface; and
detecting a distance from an obstacle located beside a side of the main body.

19. The method of claim 18, wherein the performing control such that the main body and the obstacle are maintained at a predetermined distance comprises changing a direction of movement of the main body when the obstacle is detected in front of the main body.

20. The method of claim 19, wherein the projecting the auxiliary body comprises projecting the auxiliary body outside of the main body when the direction of movement of the main body changes due to the obstacle located in front of the main body.

21. The method of claim 20, wherein the projecting the auxiliary body further comprises rotating the auxiliary body through a predetermined angle depending on a depth of a surface of the obstacle when projecting from the main body.

22. The method of claim 20, wherein the main body and the auxiliary body respectively comprise a first intake port and a second intake port, the first and second intake ports sucking dust and dirt from the surface along which the robot is driven.

23. The method of claim 18, wherein the performing control such that the main body and the obstacle are maintained at a predetermined distance comprises:
controlling a direction of movement of the main body based on a difference between the detected distance between the outside surface of main body and the obstacle located beside the main body and the distance from the outside surface of the main body to the far end of the auxiliary body.

24. The method of claim 23, wherein the performing control such that the main body and the obstacle are maintained at a predetermined distance comprises moving the main body away from the obstacle when the distance from a side of the main body to the obstacle is smaller than a first reference value or the distance from the outside surface of the main body to the outer end of the auxiliary body is smaller than a second reference value.

25. The method of claim 23, wherein the performing control such that the main body and the obstacle are maintained at a predetermined distance comprises moving the main body toward the obstacle when the distance from the side of the main body to the obstacle is larger than a third reference value and the distance from the outside surface of the main body to the outer end of the auxiliary body is larger than a fourth reference value.

26. The method of claim 23, wherein the performing control such that the main body and the obstacle are maintained at a predetermined distance comprises moving the main body away from the obstacle when a difference between the distance from the side of the main body to the obstacle and the distance from the outside surface of the main body to the outer end of the auxiliary body is smaller than a fifth reference value.

27. The method of claim 23, wherein the performing control such that the main body and the obstacle are maintained at a predetermined distance comprises moving the main body toward the obstacle when a difference between the distance from the side of the main body to the obstacle and the distance from the outside surface of the main body to the outer end of the auxiliary body is larger than a sixth reference value.

28. The method of claim 17, wherein the projecting the auxiliary body comprises projecting the auxiliary body outside of the main body through an opening that is formed in one side of the main body.

29. The method of claim 17, wherein the auxiliary body is connected with a motor which is mounted in the main body.

30. The method of claim 17, wherein the auxiliary body is connected with a connection rod on one side of which is connected with a motor mounted in the main body.

31. The method of claim 17, wherein the projecting the auxiliary body comprises detecting contact between one side of the auxiliary body and the obstacle.

32. The method of claim 31, wherein:
the detecting contact with the obstacle comprises generating a predetermined signal when contact is made with the obstacle; and
the performing control such that the main body and the obstacle are maintained at a predetermined distance comprises controlling a direction of movement of the main body in response to the generated signal.

33. A robot having a main body and an auxiliary body projecting from the main body, the robot comprising:
a distance detection unit which determines a distance between an outside surface of the main body and an obstacle;
a control unit which determines a distance from the outside surface of the main body to a far end of the auxiliary body and controls a movement of the robot based on the distances determined by the distance detection unit and the control unit, such that the robot moves while maintaining a predetermined distance from the obstacle.

34. The robot of claim 33, wherein the auxiliary body comprises:
an obstacle detection unit projecting from an opening in the main body of the robot, to detect obstacles around the main body by making contact with a surface of the obstacles.

35. The robot of claim 34, wherein the control unit controls the movement of the robot based on a signal from the obstacle detection unit and based on a difference between the distances determined by the distance detection unit and the control unit.

36. A method of controlling a robot comprising a distance detection unit and an obstacle detection unit, the method comprising:
detecting, via the distance detection unit, whether an obstacle is located in front of a main body of the robot while moving the robot along a surface;
controlling the robot to change a direction of movement based upon the detection result;
controlling the obstacle detection unit to project from an opening in the main body;
determining a distance from an outside surface of the main body to the obstacle, and a distance from the outside surface of the main body to an outer end of the obstacle detection unit; and
controlling the direction of movement of the main body based on the distances determined.

37. The method of claim 36, wherein:
when a difference between the distances is larger than a first reference value it is determined that a surface of the obstacle is convex and the main body is moved in a direction away from the obstacle, and
when the distance between the outer surface of the main body to the outer end of the obstacle detection unit is larger than a second reference value, it is determined that the surface of the obstacle is concave and the main body is moved toward the obstacle.

* * * * *